(12) United States Patent
Lee et al.

(10) Patent No.: US 11,164,438 B2
(45) Date of Patent: Nov. 2, 2021

(54) SYSTEMS AND METHODS FOR DETECTING ANOMALIES IN GEOGRAPHIC AREAS

(71) Applicant: Motorola Solutions, Inc., Chicago, IL (US)

(72) Inventors: Dung-Han Lee, Pittsburgh, PA (US); Yanyan Hu, Bedford, MA (US); Qifan Liang, Quincy, MA (US); Kangyan Liu, Revere, MA (US); Yin Wang, Woburn, MA (US); Weijuan Wu, Winchester, MA (US); Chia Ying Lee, Medford, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/837,781

(22) Filed: Apr. 1, 2020

(65) Prior Publication Data
US 2021/0312783 A1  Oct. 7, 2021

(51) Int. Cl.
| | |
|---|---|
| G08B 21/18 | (2006.01) |
| G06N 5/04 | (2006.01) |
| G06N 20/00 | (2019.01) |
| G06Q 50/26 | (2012.01) |

(52) U.S. Cl.
CPC ............. *G08B 21/18* (2013.01); *G06N 5/04* (2013.01); *G06N 20/00* (2019.01); *G06Q 50/265* (2013.01)

(58) Field of Classification Search
CPC .......... G08B 21/18; G06N 20/00; G06N 5/04; G06Q 50/265

USPC ...................................................... 340/686.1
See application file for complete search history.

(56) References Cited

U.S. PATENT DOCUMENTS

| | | | | |
|---|---|---|---|---|
| 8,280,153 | B2* | 10/2012 | Cobb | G06T 11/206 |
| | | | | 382/155 |
| 10,121,064 | B2* | 11/2018 | Hong | G16H 30/40 |
| 10,673,880 | B1* | 6/2020 | Pratt | G06N 20/00 |
| 2004/0223054 | A1* | 11/2004 | Rotholtz | H04N 7/181 |
| | | | | 348/143 |

(Continued)

OTHER PUBLICATIONS

Dinesh Singh et al., "Graph formulation of video activities for abnormal activity recognition", Pattern Recognition vol. 65, Jan. 3, 2017, pp. 265-272.

(Continued)

*Primary Examiner* — Kerri L McNally
(74) *Attorney, Agent, or Firm* — Baker Botts L.L.P.

(57) ABSTRACT

Methods for detecting anomalies in a geographic area include receiving, from an electronic computing device, expected relationship data indicating expected relationships between a plurality of entities within the geographic area; detecting the plurality of entities within the geographic area; generating observed relationship data indicating observed relationships between the plurality of entities; identifying the expected relationships between the plurality of entities based on the expected relationship data; determining that a given observed relationship between two entities of the plurality of entities is likely to represent an anomaly based on the expected relationship data; and providing an electronic notification to a safety officer, the electronic notification indicating that the given observed relationship is likely to represent the anomaly.

20 Claims, 6 Drawing Sheets

(56) References Cited

U.S. PATENT DOCUMENTS

2017/0118240 A1* 4/2017 Devi Reddy ....... H04L 63/1433

OTHER PUBLICATIONS

Wenqing Chu et al, "Sparse Coding Guided Spatiotemporal Feature Learning for Abnormal Event Detection in Large Videos", IEEE Transactions on Multimedia, vol. 21, No. 1, Jan. 2019, pp. 246-255.
Tomas Izo et al., "Unsupervised Modeling of Object Tracks for Fast Anomaly Detection", IEEE, ICIP 2007.
Brendan Tran Morris et al., "Trajectory Learning for Activity Understanding: Unsupervised, Multilevel, and Long-Term Adaptive Approach", IEEE Transactions on Pattern Analysis and Machine Intelligence, vol. 33, No. 11, Nov. 2011.

* cited by examiner

FIG. 6

SYSTEMS AND METHODS FOR DETECTING ANOMALIES IN GEOGRAPHIC AREAS

BACKGROUND OF THE INVENTION

People located within a geographic location typically share relationships with their surroundings and between one another. For example, a city park may include people walking along a sidewalk or organized in a sporting activity. People may also share relationships with objects within the geographic location. For example, a student walking across a university campus may be holding text books or wearing a backpack. These relationships may be considered typical, or statistically normal, within the context of the geographic location. Conventional surveillance systems designed to monitor geographic locations may be equipped to detect anomalies occurring within the geographic locations, or instances in which relationships deviate from the statistically normal relationships. Such surveillance systems may be rule-based, requiring a safety organization, business enterprise, or administrator to hard code data indicating statistically normal relationships into a database such that observed deviations from the normal relationships may be detected as anomalies. However, such means of detection may be limited in scope given that the statistically normal relationships are predefined and impervious to changes within the geographic location. Furthermore, such means of detection may require continued input from a user in order to accurately detect anomalies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for detecting anomalies in geographic areas. In one embodiment, a disclosed system for detecting anomalies in a geographic area includes: an electronic computing device; and a monitoring device located in the geographic area, the monitoring device configured to: receive expected relationship data from the electronic computing device, the expected relationship data indicating expected relationships between a plurality of entities within the geographic area; detect the plurality of entities within the geographic area; generate observed relationship data indicating observed relationships between the plurality of entities; identify the expected relationships between the plurality of entities based on the expected relationship data; determine that a given observed relationship between two entities of the plurality of entities is likely to represent an anomaly based on the expected relationship data; and provide an electronic notification to a safety officer, the electronic notification indicating that the given observed relationship is likely to represent the anomaly.

In one or more of the disclosed embodiments, the electronic computing device is configured to: receive a data stream from the monitoring device, the data stream including object classifiers describing the plurality of entities within the geographic area; generate trajectory data for the plurality of entities based on the data stream, the trajectory data indicating a respective trajectory for each of the plurality of entities; identify trajectory relationships between the plurality of entities based on the object classifiers and the trajectory data; provide the trajectory data and the trajectory relationships to a machine-learned model as training data; generate the expected relationship data based on the machine-learned model; and transmit the expected relationship data to the monitoring device.

In one or more of the disclosed embodiments, to generate the observed relationship data indicating the observed relationships between the plurality of entities, the monitoring device is further configured to: generate a plurality of nodes representing the plurality of entities within the geographic area, each of the plurality of nodes representing an entity of the plurality of entities; and generate a plurality of edges, each of the plurality of edges representing a relationship between two nodes of the plurality of nodes.

In one or more of the disclosed embodiments, to determine that the given observed relationship between the two entities is likely to represent the anomaly, the monitoring device is further configured to, for a pair of nodes of the plurality of nodes: determine that the pair of nodes includes an edge of the plurality of edges based on the observed relationship data, wherein the pair of nodes does not include the edge based on the expected relationship data; or determine that the pair of nodes does not include the edge based on the observed relationship data, wherein the pair of nodes includes the edge based on the expected relationship data.

In one or more of the disclosed embodiments, the observed relationships between the plurality of entities comprise at least one of: an observed positional orientation of each of the plurality of entities in relation to one another, the observed positional orientation indicated by the observed relationship data; and an observed temporal orientation of each of the plurality of entities in relation to one another, the observed temporal orientation indicated by the observed relationship data.

In one or more of the disclosed embodiments, the expected relationships between the plurality of entities within the geographic area comprise at least one of: an expected positional orientation of each of the plurality of entities in relation to one another, the expected positional orientation indicated by the expected relationship data; and an expected temporal orientation of each of the plurality of entities in relation to one another, the expected temporal orientation indicated by the expected relationship data.

In one or more of the disclosed embodiments, the monitoring device is further configured to: receive, from an electronic communication device of the safety officer, confirmation data indicating that the given observed relationship represents the anomaly.

In one or more of the disclosed embodiments, the monitoring device is further configured to: receive, from an electronic communication device of the safety officer, rejection data indicating that the given observed relationship does not represent the anomaly; and modify the expected relationship data to indicate that the given observed relationship does not represent the anomaly.

In one or more of the disclosed embodiments, a disclosed method for detecting anomalies in a geographic area includes: receiving, from an electronic computing device, expected relationship data indicating expected relationships between a plurality of entities within the geographic area; detecting the plurality of entities within the geographic area; generating observed relationship data indicating observed relationships between the plurality of entities; identifying the expected relationships between the plurality of entities based on the expected relationship data; determining that a given observed relationship between two entities of the plurality of entities is likely to represent an anomaly based on the expected relationship data; and providing an electronic notification to a safety officer, the electronic notification indicating that the given observed relationship is likely to represent the anomaly.

In one or more of the disclosed embodiments, a computer readable medium storing program instructions executable by a processor is disclosed. The program instructions are executable by the processor for performing: receiving, from an electronic computing device, expected relationship data indicating expected relationships between a plurality of entities within a geographic area; detecting the plurality of entities within the geographic area; generating observed relationship data indicating observed relationships between the plurality of entities; identifying the expected relationships between the plurality of entities based on the expected relationship data; determining that a given observed relationship between two entities of the plurality of entities is likely to represent an anomaly based on the expected relationship data; and providing an electronic notification to a safety officer, the electronic notification indicating that the given observed relationship is likely to represent the anomaly.

Figure 1:
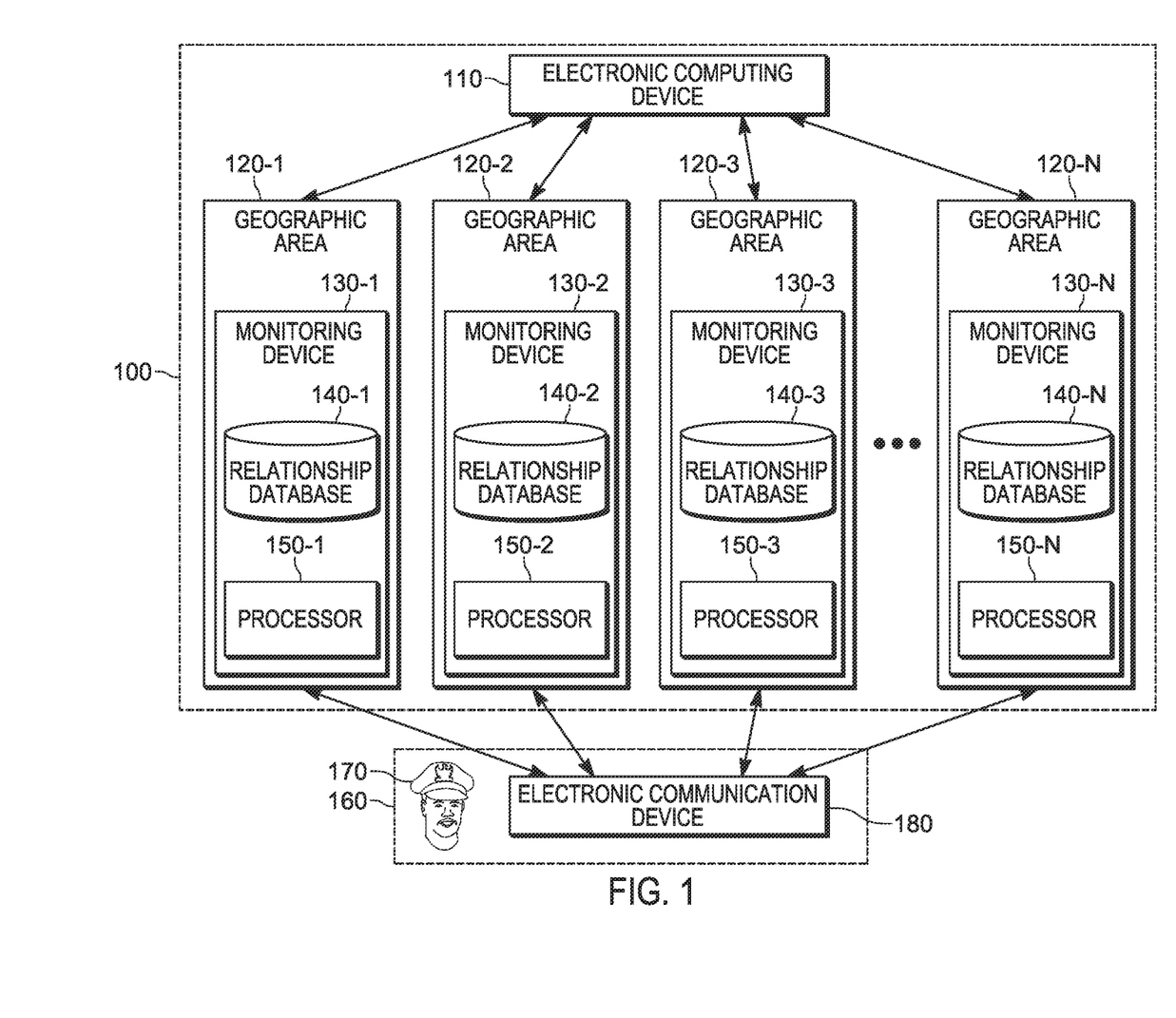
FIG. 1 illustrates a block diagram of selected elements of an example anomaly detection system, in accordance with some embodiments.

FIG. 1 illustrates a block diagram of selected elements of an example anomaly detection system, in accordance with some embodiments. In the embodiment illustrated in FIG. 1, anomaly detection system 100 includes an electronic computing device 110 and monitoring devices 130-1 through 130-N (collectively referred to herein as "monitoring devices 130") located in geographic areas 120-1 through 120-N (collectively referred to herein as "geographic areas 120"), respectively. Monitoring devices 130 may include relationship databases 140-1 through 140-N and processors 150-1 through 150-N. As illustrated in FIG. 1, anomaly detection system 100 may communicate with a safety organization 160 that includes a safety officer 170 and an electronic communication device 180. In other embodiments, anomaly detection system 100 may include additional, fewer, or any combination of elements suitable for detecting anomalies in geographic areas.

In some embodiments, each of the geographic areas 120 may represent a respective portion of a geographic location to be monitored by monitoring devices 130. In the embodiment illustrated in FIG. 1, each of the geographic areas 120 may include a respective monitoring device 130. In one embodiment, a geographic location may be partitioned into geographic areas 120 such that the total area comprising the geographic location is represented by respective geographic areas 120. In this embodiment, the total area comprising the geographic location may be monitored by monitoring devices 130, e.g., using one or more monitoring devices 130 for each of the geographic areas 120. For example, a business enterprise may partition an exterior area surrounding the business enterprise into geographic areas 120 such that the entire exterior area may be monitored where each geographic area 120 includes one or more monitoring devices 130. In another embodiment, a geographic location may be partitioned into geographic areas 120 such that relevant portions of the total area comprising the geographic location are represented by respective geographic areas 120. In this embodiment, only the relevant portions of the geographic location may be monitored by monitoring devices 130. For example, a city park may be partitioned according to areas accessible to, or frequented by, the public in which each accessible, or frequented, area is represented by a geographic area 120.

In some embodiments, electronic computing device 110 may comprise a system, device, or apparatus operable to generate data indicating relationships between entities within geographic areas 120. In particular, electronic computing device 110 may generate data indicating expected relationships, or "expected relationship data," between the entities within a geographic area 120. Here, entities may comprise persons, animals, objects, buildings, structures or any distinct physical embodiment captured by monitoring devices 130 disposed throughout respective geographic areas 120. Expected relationships may indicate typical, or statistically normal, relationships amongst entities as observed over an adjustable training period. For example, for an adjustable training period of one week, electronic computing device 110 may generate expected relationship data based on relationships between entities observed throughout the one-week training period. During the adjustable training period, electronic computing device 110 may receive data streams from monitoring devices 130 deployed throughout respective geographic areas 120. The data stream received from each monitoring device 130 may include data describing entities within the respective geographic areas 120, e.g., such as object classifiers generated by an object recognition algorithm. Electronic computing device 110 may use the data describing entities, in part, to generate expected relationship data for each respective geographic area 120. In one embodiment, electronic computing device 110 may be or include a server computing device. In other embodiments, electronic computing device 110 may be or include be a personal computer, a desktop computer system, a laptop computer system, a mobile device, a tablet computing device, a personal digital assistant (PDA), a consumer electronic device, or any combination of computing devices suitable for generating data indicating relationships between entities within geographic areas 120. It is noted that although a single electronic computing device 110 is illustrated in FIG. 1, anomaly detection system may include any number of electronic computing devices 110 suitable for generating data indicating relationships between entities within geographic areas 120.

In one embodiment, electronic computing device 110 may use the data describing entities included in a data stream received from a monitoring device 130 during a training period to identify each entity within a geographic area 120. Specifically, electronic computing device 110 may use object classifiers included in a data stream to identify each entity within a geographic area 120. For example, electronic computing device 110 may use object classifiers included in a data stream received from monitoring device 130-1 (shown in FIG. 1) to identify a dog, a person, and a sidewalk within geographic area 120-1. In one embodiment, electronic computing device 110 may generate a node for each identified entity within the data stream. Here, each node may be represented as an entry within a graph data structure representing a geographic area 120. For example, each node may be represented by a struct data type that includes the object classifier, or object classifiers, describing the entity that the node represents. In the example given above, electronic computing device 110 may generate respective nodes to represent the dog, the person, and the sidewalk within a graph data structure representing geographic area 120-1.

In one embodiment, electronic computing device 110 may generate data indicating a respective trajectory, or "trajectory data," for each entity within a geographic area 120 based on the data stream received during a training period. Specifically, electronic computing device 110 may generate trajectory data for each node representing an entity by tracking each position of the entity during the training period. Each data stream received from monitoring devices 130 may be or include a video steam comprised of a series of frames that each illustrate a spatial orientation of entities within a geographic area 120. For each data stream received, electronic computing device 110 may identify a change, or a continuity, in spatial orientation for each entity within the geographic area 120 over consecutive frames. For example, an entity may appear in position (X1, Y1) within a geographic area 120 at time T1 in a frame of a video stream received from the geographic area 120. The entity may next appear to have moved to position (X2, Y2) at time T2 in a consecutive frame as the video stream advances. Electronic computing device 110 may track each position of the entity, e.g., using a bounding box, in relation to the temporal relationship between consecutive frames, e.g., using a timestamp, to generate trajectory data for the node representing the entity. In one embodiment, each node representing an entity within a geographic area 120 may include trajectory data indicating a trajectory of the entity that the node represents.

In one embodiment, electronic computing device 110 may identify relationships between trajectories, or "trajectory relationships," of entities within a geographic area 120 during a training period. In particular, electronic computing device 110 may identify nodes that exhibit similar trajectories based on trajectory data for each node. For example, trajectory data for two or more nodes may indicate that the two or more entities represented by the two or more nodes exhibit similar trajectories as the two or more entities traverse a geographic area 120. In one embodiment, electronic computing device 110 may generate an edge used to represent a relationship between two nodes within a graph data structure. In the example described above, electronic computing device 110 may generate an edge between the node representing the dog and the node representing the sidewalk, the node representing the person and the node representing the sidewalk, as well as the node representing the dog and the node representing the person. Here, edges may exist between the nodes representing the dog and sidewalk, person and sidewalk, and dog and person indicating that the nodes exhibit similar trajectories as the person walks the dog on the sidewalk within geographic area 120-1. In one embodiment, each graph data structure representing a geographic area 120 may include a list, e.g., an edge list, indicating relationships between nodes representing entities within the graph data structure.

In one embodiment, an edge generated to connect two nodes representing two entities may describe a relationship between the two entities. That is, an edge generated between two nodes may represent a relationship one node shares in relation to the other node to which the node is connected. In one embodiment, an edge connecting two nodes may indicate a spatial relationship, or "positional orientation," of one node in relation to the other node. For example, a node representing a hat and a node representing a person in geographic area 120-2 (shown in FIG. 1) may include an edge indicating a positional orientation in which the hat is oriented above the person to represent the spatial relationship between the hat and the person wearing the hat within geographic area 120-2. Here, the node representing the hat and the node representing the person may exhibit similar trajectories within the graph data structure representing geographic area 120-2 as both the hat and the person wearing the hat traverse geographic area 120-2 in unison. In another embodiment, positional orientation may indicate a spatial proximity between two entities. For example, a node representing a person and a node representing a backpack in geographic area 120-3 (shown in FIG. 1) may include an edge indicating a positional orientation in which the backpack is oriented proximate to the person, representing the spatial relationship between the backpack and the person wearing the backpack within geographic area 120-3. Here, the node representing the person and the node representing the backpack may exhibit similar trajectories within the graph data structure representing geographic area 120-3. In contrast, nodes within a graph data structure that do not exhibit similar trajectories may not receive an edge indicating a relationship, thus indicating that the nodes are unrelated.

In one embodiment, an edge connecting two nodes may indicate a temporal relationship, or a "temporal orientation," of one node in relation to the other node. For example, a node representing a car and a node representing a street in geographic area 120-N (shown in FIG. 1) may include an edge indicating a temporal orientation in which the car has been parked on the street for a given period of time. In one embodiment, temporal orientation shared between two nodes may be derived from the positional orientation between the two nodes over time. In particular, electronic computing device 110 may derive temporal orientation between two nodes from the positional orientation between the two nodes over consecutive frames of a video stream during a training period. For example, the node representing the car and the node representing the street in geographic area 120-N described above may include an edge indicating a positional orientation in which the car is oriented above, or proximate to, the street to represent the spatial relationship between the car and the street upon which the car is parked. Electronic computing device 110 may identify that the edge indicating the positional orientation of the car in relation to the street has consistently connected the two nodes throughout a training period of one week. Thus, electronic computing device 110 may determine that the temporal orientation shared between the two nodes may additionally, or alternatively, be represented by an edge indicating a temporal orientation of approximately 168 hours, or one week. In other embodiments, an edge between two nodes may additionally, or alternatively, indicate a velocity of one node in relation to the other node, a movement of one node in relation to the other node, or any combination of indications suitable for describing a relationship shared between two nodes. In one embodiment, an edge between two nodes may be or include a binary edge in which two nodes are either connected to indicate a relationship or not connected to indicate that the two nodes are unrelated. In another embodiment, an edge between two nodes may be or include a weighted edge in which two nodes are connected according to a numerical threshold upon which the two nodes are determined to be no longer connected. Nodes and edges are described in further detail with respect to FIGS. 2A-5B.

In one embodiment, electronic computing device 110 may generate expected relationship data indicating expected relationships between entities within a geographic area 120 during a training period. As described above, expected relationships may indicate typical, or statistically normal, relationships amongst entities as observed over the training period. That is, electronic computing device 110 may identify relationships between entities within respective geographic areas 120 during a training period and determine which of those identified relationships are, statistically, most likely to occur within the geographic area 120. In one embodiment, electronic computing device 110 may provide the trajectory data indicating respective trajectories of each node representing the entities and the trajectory relationships between nodes to a machine-learned model as training data. In one embodiment, trajectory data and trajectory relationships may be provided to the machine-learned model from respective graph data structures representing each geographic area 120. In another embodiment, trajectory data and trajectory relationships may be plotted within a visual representation of a graph data structure representing a geographic area 120 and provided to the machine-learned model, e.g., as a file illustrating a graph including nodes and edges. The machine-learned model may identify patterns that most frequently occur within the training data for a geographic area 120 during the training period. In one embodiment, electronic computing device 110 may use these identified patterns to generate expected relationship data for each geographic area 120. In another embodiment, the machine-learned model may generate the expected relationship data for each geographic area 120. In another embodiment, electronic computing device 110 may identify the patterns that most frequently occur within the trajectory data and trajectory relationships for a geographic area 120 during a training period without employing a machine-learned model.

In various embodiment, expected relationship data may indicate expected spatial or temporal relationships between nodes. Expected relationship data may indicate an expected spatial relationship, or "expected positional orientation," shared between nodes within a geographic area 120 during a training period. For example, expected positional orientation may indicate that a node representing a person and a node representing a backpack typically include an edge during a training period indicating that the backpack is being worn by the person rather than being removed or discarded. Similarly, expected relationship data may indicate an expected temporal relationship, or "expected temporal orientation," shared between nodes within a geographic area 120 during a training period. For example, expected temporal orientation may indicate that a node representing a car and a node representing a street typically do not include an edge for prolonged periods, such as several days or weeks, during a training period indicating that the car is not illegally parked or abandoned. Once a training period has ended, electronic computing device 110 may provide the expected relationship data to monitoring device 130. In particular, electronic computing device 110 may transmit the expected relationship data pertaining to a geographic area 120 to the monitoring device 130, or monitoring devices 130, within the geographic area 120. Each geographic area 120 may yield its own expected relationship data based on the types of entities typically located within the geographic area 120.

In some embodiments, each of the monitoring devices 130 may comprise a system, device, or apparatus operable to capture information associated with entities within geographic areas 120. In particular, each monitoring device 130 may determine if one or more anomalies likely exist in relationships shared between entities within geographic areas 120. In the embodiment illustrated in FIG. 1, each monitoring device 130 includes a relationship database 140 and a processor 150. In one embodiment, each monitoring device 130 may receive expected relationship data indicating expected relationships between entities within the geographic area 120 in which the monitoring device 130 is deployed. In another embodiment, each monitoring device 130 may generate its own expected relationship data using processor 150. Each monitoring device 130 may store the expected relationship data in relationship database 140 such that the expected relationship data may be accessed by processor 150 to identify expected relationships between entities within a geographic area 120. In one embodiment, each of the monitoring devices 130 may be or include an audio capture device, an image capture device, a video capture device, a private security monitoring system, or a public safety monitoring system. In other embodiments, each of the monitoring devices 130 may include electrical, mechanical, or environmental sensors, radio frequency identification (RFID) sensors, ultrasonic sensors, or other measuring devices suitable for capturing the state of geographic areas 120 in which they are deployed. In some embodiments, each of the monitoring devices 130 deployed throughout a geographic location may be of the same type. In other embodiments, each of the monitoring devices 130 deployed throughout a geographic location may be of two or more types. It is noted that although each of the geographic areas 120 illustrated in FIG. 1 includes a single monitoring device 130, in other embodiments each of the geographic areas 120 may include any number of monitoring devices 130 suitable for capturing information associated with entities within geographic areas 120.

In one embodiment, each monitoring device 130 may detect entities within a geographic area 120. In particular, monitoring device 130 may detect entities within the geographic area 120 in which the monitoring device 130 is deployed. In one embodiment, monitoring device 130 may be or include an image sensor, e.g., such as an RGB camera, having a field of view spanning a portion, or entirety, of geographic area 120. Monitoring device 130 may detect entities within the geographic area 120 as the entities enter the field of view of monitoring device 130. In another embodiment, monitoring device 130 may be or include a proximity sensor, e.g., such as a light detection and ranging (LiDAR) sensor, that emits pulses of laser light beams throughout a geographic area 120. Monitoring device 130 may detect entities within the geographic area 120 as the entities reflect the laser light beams while entering geographic area 120. In another embodiment, monitoring device 130 may be or include an audio sensor, e.g., such as an ultrasonic sensor, that emits sound waves throughout geographic area 120. Monitoring device 130 may detect entities within the geographic area 120 as the entities reflect the sound waves while entering geographic area 120. In other embodiments, entities may be detected using any combination of monitoring devices 130 described above. For example, a proximity sensing monitoring device 130 may detect the presence of an entity within a geographic area 120 and an image sensing monitoring device 130 may identify object classifiers describing the entity once the presence has been detected.

In one embodiment, each monitoring device 130 may classify entities detected within a geographic area 120. For example, processor 150 may employ an object recognition algorithm used to assign an object classifier to each entity detected within a geographic area 120 by monitoring device 130. In one embodiment, processor 150 may further employ one or more segmentation tasks, e.g., such as foreground-background segmentation, to segment images captured by monitoring device 130 into foreground and background segments. Examples of entities detected in foreground segments may include persons, animals, objects, or any distinct physical embodiment within the foreground of a video stream captured by monitoring device 130. Examples of entities detected in background segments may include buildings, structures, sky, sidewalks, streets, or any distinct physical embodiment within the background of a video stream captured by monitoring device 130. In one embodiment, monitoring device 130 may generate a node for each classified entity within a geographic area 120. For example, processor 150 may generate a node for each detected entity in a video stream and classify each node using an object classifier. In one embodiment, each node may be represented as an entry within a graph data structure representing a geographic area 120. For example, each node may be represented by a struct data type that includes the object classifier, or object classifiers, describing the entity that the node represents. Each graph data structure representing a respective geographic area 120 may be stored in the relationship database 140 of the geographic area 120 along with expected relationship data, for example, received from electronic computing device 110.

In one embodiment, monitoring device 130 may generate data indicating observed relationships, or "observed relationship data," between entities within a geographic area 120. Specifically, processor 150 may generate trajectory data for each node representing an entity within a geographic area 120 and identify trajectory relationships between nodes (as described above with respect to electronic computing device 110). Based on the trajectory data for each node representing an entity and the identified trajectory relationships, processor 150 may generate edges to represent relationships between entities as described above. Here, an edge connecting two nodes may describe a relationship between two entities captured by monitoring device 130. In one embodiment, processor 150 may generate an edge between two nodes that indicates an observed spatial relationship, or "observed positional orientation," of one node in relation to the other node. For example, if monitoring device 130-1 (shown in FIG. 1) detects two entities within geographic area 120-1 and identifies one entity to be a person and the other entity to be a building, processor 150 may generate an edge indicating an observed positional orientation in which the person is oriented in front of the building to represent the spatial relationship between the person and the building. In another embodiment, observed positional orientation may indicate a spatial proximity between two entities. For example, if monitoring device 130-2 (shown in FIG. 1) detects two entities within geographic area 120-2 and identifies both entities to be persons walking together while holding hands, processor 150 may generate an edge indicating an observed positional orientation in which one person is oriented proximate to the other person, representing the spatial relationship between the two persons holding hands. In another embodiment, processor 150 may generate an edge between two nodes that indicates an observed temporal relationship, or "observed temporal orientation," of one node in relation to the other node. For example, if monitoring device 130-3 (shown in FIG. 1) detects two entities within geographic area 120-3 and identifies one entity to be a person and the other entity to be a park bench, processor 150 may generate an edge indicating an observed temporal orientation indicating a length of time in which the person has been sitting on the park bench. In one embodiment, observed temporal orientation shared between two nodes may be derived from the observed positional orientation between the two nodes over time (as described above with respect to electronic computing device 110). In one embodiment, observed relationship data for a geographic area 120 may be stored in the relationship database 140 of the geographic area 120 with expected relationship data, for example, received from electronic computing device 110.

In one embodiment, processor 150 may access expected relationship data, e.g., stored in relationship database 140, to identify expected relationships between entities. Specifically, processor 150 may access expected relationship data indicating expected relationships between entities within a geographic area 120 to compare the expected relationship data with observed relationship data generated by monitoring device 130. Here, processor 150 may determine, for each pair of nodes within a graph data structure representing the geographic area 120, which pairs of nodes of the observed relationship data match with, or otherwise resemble, pairs of nodes of the expected relationship data. By determining which pairs of nodes of the observed relationship data match with the pairs of nodes of the expected relationship data, processor 150 may determine that a given observed relationship between two entities is likely to represent an anomaly. In particular, processor 150 may determine that a pair of nodes for a given observed relationship includes an edge where the pair of nodes does not include the edge based on expected relationship data. Similarly, processor 150 may determine that a pair of nodes for a given observed relationship does not include an edge where the pair of nodes does include the edge based on expected relationship data. Here, processor 150 may determine that the given observed relationship between two entities represented by the pair of nodes likely represents an anomaly. Upon determining that the given observed relationship likely represents an anomaly, processor 150 may provide an electronic notification to a safety officer 170 indicating that the given observed relationship is likely to represent an anomaly. For example, processor 150 may transmit a signal to electronic communication device 180 indicating that the given observed relationship likely represents the anomaly.

In one embodiment, safety organization 160 may be or include a public or private safety entity designated to ensure the protection of persons, organizations, and institutions. In the example illustrated in FIG. 1, safety organization 160 includes a safety officer 170 and an electronic communication device 180. In response to receiving an electronic notification to safety officer 170 indicating a likely anomaly, electronic communication device 180 may present the notification to safety officer 170, e.g., via a display of electronic communication device 180. In one embodiment, the notification to safety officer 170 may include a segment of a video stream captured by monitoring device 130 that depicts the given observed relationship between the two entities that likely represents the anomaly. Here, electronic communication device 180 may additionally present a user interface (not shown in figure) through which safety officer 170 may provide input regarding the validity of the notification. In particular, safety officer 170 may provide confirmation data, e.g., via the user interface, indicating that the given observed relationship represents the anomaly. Similarly, safety officer 170 may provide rejection data indicating that the given observed relationship does not represent the anomaly. In one embodiment, electronic communication device 180 may display simple widgets with the notification to safety officer 170 that represent confirmation and rejection options. For example, a segment of a video stream may include a "thumbs up" widget that may be selected to transmit confirmation data and a "thumbs down" widget that may be selected to transmit rejection data.

In one embodiment, if safety officer 170 provides confirmation data indicating that the given observed relationship does represent the anomaly, safety officer 170, or safety officers, may be deployed to the geographic area 120 in which the monitoring device 130 that provided the notification is located. In one embodiment, safety organization 160 may be a public safety organization that includes public safety officers. For example, safety organization 160 may be a police department in which safety officer 170 serves the public as a police officer representing civil authority of government and authorized to carry weapons, make arrests, and enforce local, state, and federal laws. In another embodiment, safety organization 160 may be a private safety organization that includes private safety officers. For example, safety organization 160 may be a campus police department for a private university in which safety officer 170 serves as a campus police officer to protect students and private property. In other embodiments, safety organization 160 may include safety officers serving as security guards, staff employed by a private enterprise such as a company, or any combination of public and private safety personnel employed to protect persons, organizations, and institutions.

In one embodiment, if safety officer 170 provides rejection data indicating that the given observed relationship does not represent the anomaly, processor 150 may modify the expected relationship data stored in relationship database 140 to indicate that the given observed relationship does not represent the anomaly, e.g., triggered by a false alarm. In another embodiment, safety officer 170 may modify the expected relationship data, e.g., via application programming interface (API), to indicate that the given observed relationship does not represent the anomaly. In another embodiment, an administrator of anomaly detection system 100 may modify the expected relationship data to indicate that the given observed relationship does not represent the anomaly. By modifying the expected relationship data in response to receiving rejection data, anomaly detection system 100, or safety officer 170, further trains the expected relationship data to help reduce instances of false alarms and, in turn, to better detect anomalies in the geographic area 120.

FIGS. 2A-2D illustrate an example use case of generating expected relationship data for a geographic area, in accordance with some embodiments. In the example illustrated in FIGS. 2A-2D, electronic computing device 110 may generate expected relationship data for geographic area 120 based on a data stream received from monitoring device 130 (shown in FIG. 1) during a training period. In the embodiments illustrated in FIGS. 2A and 2C, the number of entities has been limited to five entities, i.e., entities 200, 210, 220, 230, and 240, for illustrative purposes. In other embodiments, a data stream may include any number of entities located within a geographic area 120 during a training period. In the embodiments illustrated in FIGS. 2B and 2D, an eight-second portion of the training period is illustrated, i.e., times T1 through T8, for illustrative purposes. In other embodiments, training periods may include any length of time suitable for generating expected relationship data for a geographic area 120.

Figure 2A:
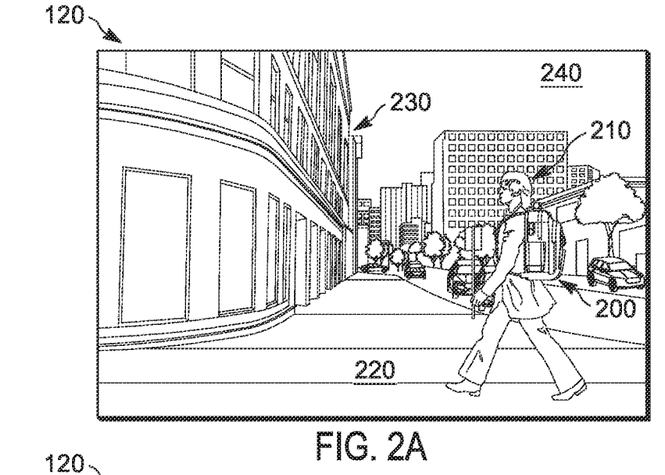
FIGS. 2A-2D illustrate an example use case of generating expected relationship data for a geographic area, in accordance with some embodiments.

FIG. 2A illustrates a data stream received from monitoring device 130 in geographic area 120 between times T1 and T4. The data stream illustrated in FIG. 2A includes entities 200, 210, 220, 230, and 240. Electronic computing device 110 may use object classifiers included in the data stream to identify each entity within geographic area 120. Here electronic computing device 110 may identify entity 200 as a backpack, entity 210 as a person, entity 220 as a sidewalk, entity 230 as a building, and entity 240 as the sky based on the object classifiers generated by processor 150 of monitoring device 130. Specifically, entities may be identified based on the object classifiers generated by the object recognition algorithm and any segmentation tasks, e.g., such as foreground-background segmentation, executed by processor 150 as described above. Once each entity has been identified, electronic computing device 110 may generate a node for each identified entity within the data stream. However, only three nodes are shown in FIG. 2B for illustrative purposes.

Figure 2B:
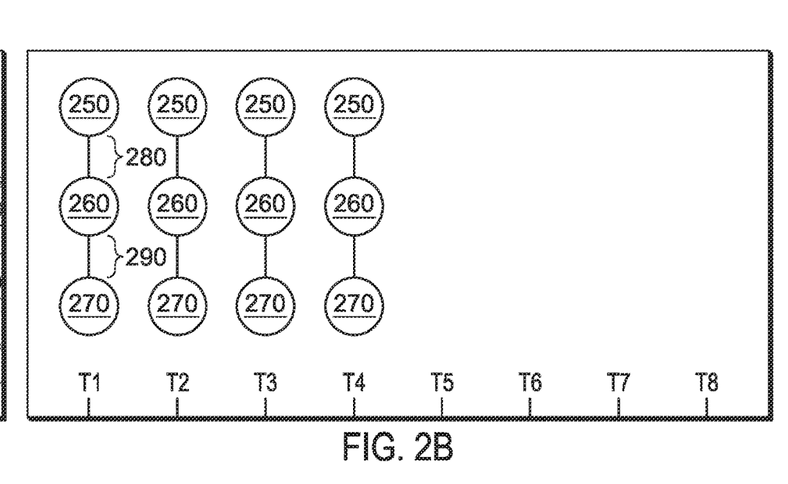

FIG. 2B illustrates a representation of a graph data structure that includes nodes representing entities shown in FIG. 2A. Specifically, FIG. 2B illustrates nodes 250, 260, and 270 representing entities 200, 210, and 220 shown in FIG. 2A, respectively. Electronic computing device 110 may generate trajectory data for each node representing an entity and identify trajectory relationships between the nodes. In the example shown in FIG. 2B, nodes 250, 260, and 270 exhibit similar trajectories from times T1 through T4. Therefore, electronic computing device 110 has generated edges indicating positional orientation shared between the nodes. Here, nodes 250 and 260 have received edge 280 indicating a positional orientation of node 250 in relation to node 260. That is, edge 280 may represent the positional orientation of entity 200 (backpack) in relation to entity 210 (person). Additionally, nodes 260 and 270 have received edge 290 indicating a positional orientation of node 260 in relation to node 270. Edge 290 may represent the positional orientation of entity 210 (person) in relation to entity 220 (sidewalk).

Figure 2C:
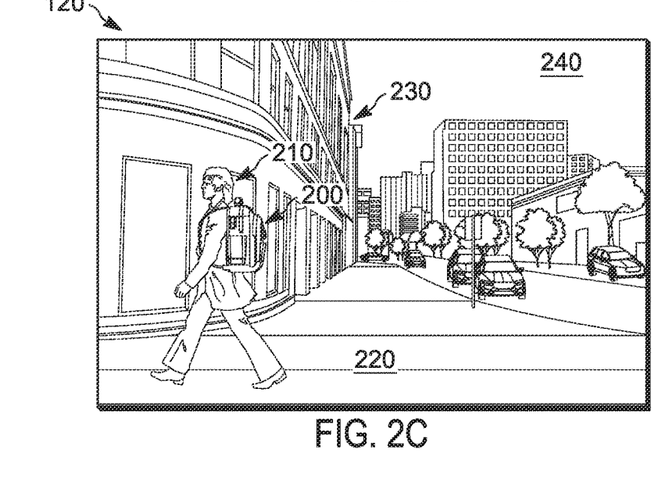

FIG. 2C illustrates the data stream received from monitoring device 130 between times T5 and T8. As shown in FIG. 2C, the data stream still includes entities 200, 210, 220, 230, and 240 that appeared in the data stream shown in FIG. 2A between times T1 and T4. No additional entities have entered the field of view of monitoring device 130 and none of the entities 200, 210, 220, 230, or 240 have exited the field of view. However, entities 200 and 210 have advanced from the previous location shown in FIG. 2A from the right side of the field of view to the left side of the field of view. Entities 220, 230, and 240 have remained static throughout the training period.

Figure 2D:
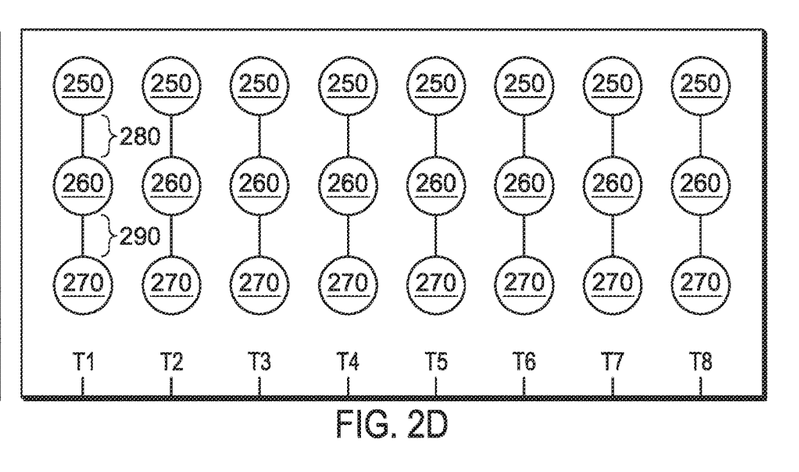

FIG. 2D illustrates nodes representing entities between times T1 and T8. As shown in FIG. 2D, the trajectory data for each node representing an entity and trajectory relationships among the nodes has remained consistent throughout the training period. That is, nodes 250, 260, and 270 have continued to exhibit similar trajectories from times T5 through T8 and have, therefore, maintained edges 280 and 290 generated by electronic computing device 110 at time T1. As the training period advances, electronic computing device 110 may identify a similar pattern between nodes representing person, backpack, and sidewalk entities. For example, a person wearing a backpack may subsequently enter geographic area 120 at a time after T8. Electronic computing device 110 may generate a node representing the person and a node representing the backpack and identify that the trajectory data and trajectory relationships remain consistent with those shown in FIG. 2D. Once the training period is complete, electronic computing device 110 may include the relationships between entities 200, 210, and 220 in the expected relationship data transmitted to monitoring device 130.

FIGS. 3A-3D illustrate an example use case of detecting anomalies in a geographic area, in accordance with some embodiments. In the example illustrated in FIGS. 3A-3D, monitoring device 130 may detect anomalies in geographic area 120 based on expected relationship data received from electronic computing device 110 (shown in FIG. 2D). In the embodiments illustrated in FIGS. 3A and 3C, the number of entities has been limited to two entities, i.e., entities 300 and 310, for illustrative purposes. In other embodiments, a field of view of monitoring device 130 may capture any number of entities located within a geographic area 120. In the embodiments illustrated in FIGS. 3B and 3D, an eight-second portion of an observation period is illustrated, i.e., times T1 through T8, for illustrative purposes. In other embodiments, observation periods may include any length of time suitable for detecting anomalies in a geographic area 120.

Figure 3A:
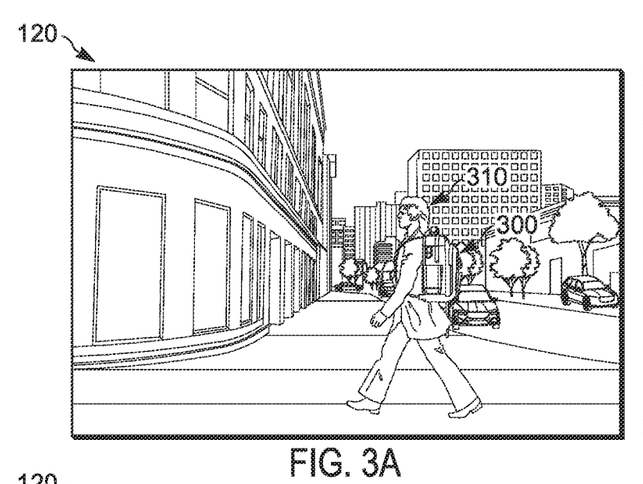
FIGS. 3A-3D, 4A-4D, 5A and 5B illustrate example use cases of detecting anomalies in a geographic area, in accordance with some embodiments.

FIG. 3A illustrates a field of view captured by monitoring device 130 in geographic area 120 between times T1 and T4. The field of view illustrated in FIG. 3A includes entities 300 and 310. Monitoring device 130 may identify each entity within the field of view. Specifically, processor 150 may execute an object detection algorithm and a segmentation task, e.g., such as foreground-background segmentation, to generate object classifiers used to identify each entity. Here, monitoring device 130 may identify entity 300 as a backpack and entity 310 as a person based on the object classifiers. Once each entity has been identified, monitoring device 130 may generate a node for each identified entity within the field of view of monitoring device 130.

Figure 3B:
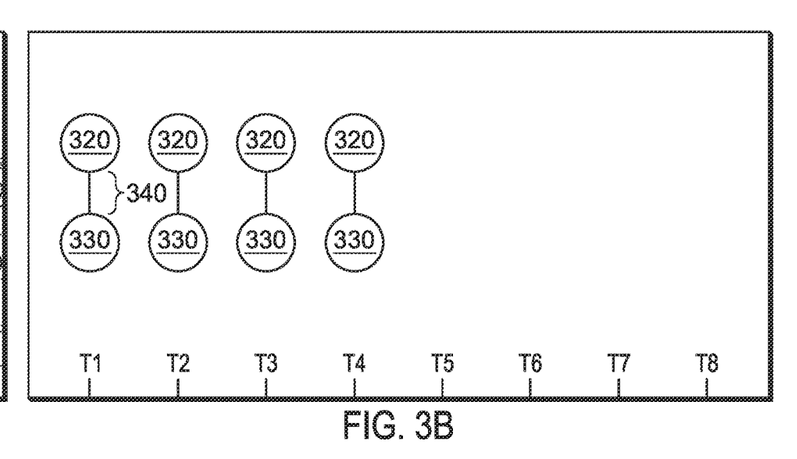

FIG. 3B illustrates a representation of a graph data structure that includes nodes representing entities shown in FIG. 3A. Specifically, FIG. 3B illustrates nodes 320 and 330 representing entities 300 and 310 shown in FIG. 3A, respectively. Processor 150 of monitoring device 130 may generate trajectory data for each node representing an entity and identify trajectory relationships among the nodes. In the example shown in FIG. 3B, nodes 320 and 330 exhibit similar trajectories from times T1 through T4. Therefore, processor 150 has generated an edge 340 indicating a positional orientation of node 320 in relation to node 330. That is, edge 340 may represent the observed positional orientation of entity 300 (backpack) in relation to entity 310 (person).

Figure 3C:
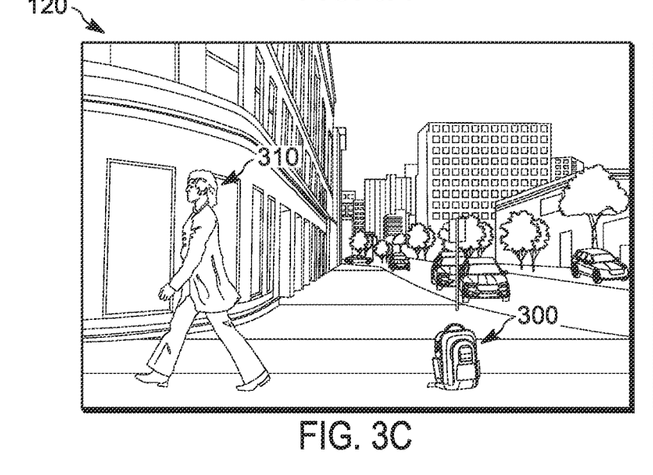

FIG. 3C illustrates the field of view captured by monitoring device 130 in geographic area 120 between times T5 and T8. As shown in FIG. 3C, the field of view captured by monitoring device 130 still includes entities 300 and 310 detected in the field of view shown in FIG. 3A from times T1 through T4. No additional entities have entered the field of view of monitoring device 130 and neither entity 300 nor entity 310 has exited the field of view. However, entity 310 has advanced from the previous location shown in FIG. 3A from the right side of the field of view to the left side of the field of view. In contrast, entity 300 has remained in the previous location shown in FIG. 3A and the two entities have become spatially separated. Specifically, entity 310 has placed entity 300 on the sidewalk and is currently walking away from entity 300.

Figure 3D:
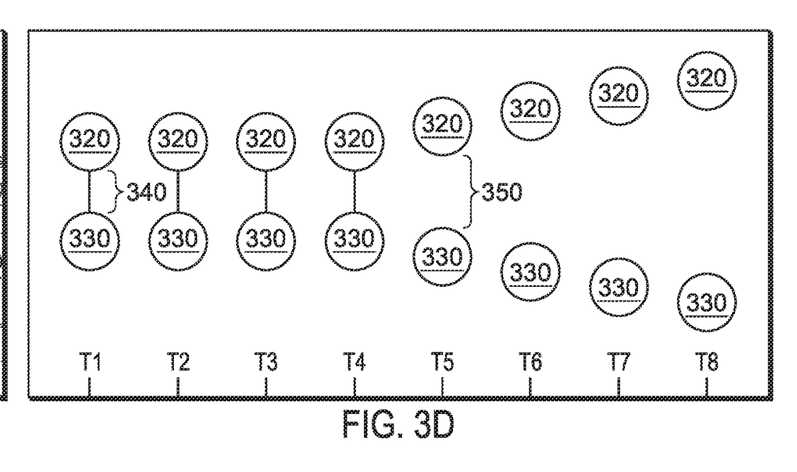

FIG. 3D illustrates nodes representing entities between times T1 and T8. As shown in FIG. 3D, the trajectory data for each node representing an entity and trajectory relationship between the nodes have changed throughout the observation period. That is, nodes 320 and 330 have started to diverge at time T5 such that edge 340 is no longer connecting the two nodes. Rather, a gap 350 has replaced edge 340 indicating that nodes 320 and 330 no longer exhibit similar trajectories and that the trajectory relationship between nodes 320 and 330 has ended as the entities grow further apart as time advances. Here, monitoring device 130 may detect an anomaly in the observed relationship data between entities 300 and 310 at time T5. Specifically, processor 150 of monitoring device 130 may access the expected relationship data stored in relationship database 140 and determine that the expected relationship between a backpack node (node 320) and a person node (node 330) typically includes an edge (similar to the expected relationship data shown in FIG. 2D). Because entities 300 and 310 no longer include edge 340 at time T5, processor 150 may provide an electronic notification to safety officer 170 indicating that the observed relationship between entities 300 and 310 is likely to represent an anomaly. The notification may be displayed on electronic communication device 180 in safety organization 160 such that safety officer 170 may cause electronic communication device 180 to transmit confirmation data indicating that the observed relationship represents the anomaly or rejection data indicating that the observed relationship does not represent the anomaly. In the example use case illustrated in FIGS. 3A-3D, safety officer 170 may provide confirmation data indicating that the observed relationship between entities 300 and 310 represents the anomaly. Detecting the anomaly in the observed relationship between entities 300 and 310 and receiving confirmation data may serve as a deterrent for potential criminal activities in geographic area 120. For example, entity 300 may represent a backpack used to provide enclosure for an explosive device left been left behind by a person. Upon providing confirmation data, safety officer 170, or safety officers, may be deployed to geographic area 120 to retrieve the backpack from geographic area 120 and apprehend the person.

FIGS. 4A-4D illustrate an example use case of detecting anomalies in a geographic area, in accordance with some embodiments. In the example illustrated in FIGS. 4A-4D, monitoring device 130 may detect anomalies in geographic area 120 based on expected relationship data received from electronic computing device 110. In the embodiments illustrated in FIGS. 4A and 4C, the number of entities has been limited to three entities, i.e., entities 400, 410, and 420, for illustrative purposes. In other embodiments, a field of view of monitoring device 130 may capture any number of entities located within a geographic area 120. In the embodiments illustrated in FIGS. 4B and 4D, an eight-second portion of an observation period is illustrated, i.e., times T1 through T8, for illustrative purposes. In other embodiments, observation periods may include any length of time suitable for detecting anomalies in a geographic area 120.

Figure 4A:
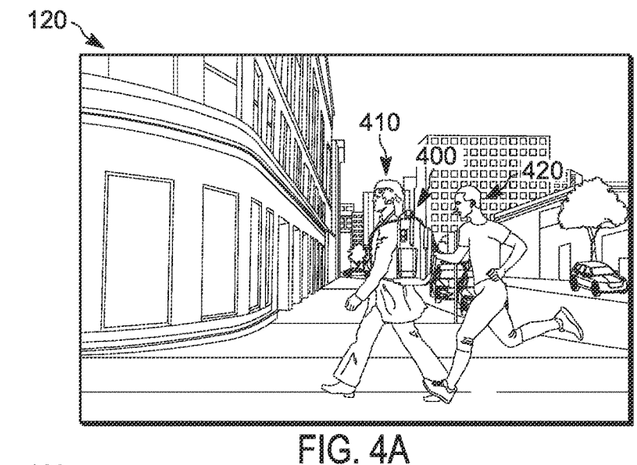

FIG. 4A illustrates a field of view captured by monitoring device 130 in geographic area 120 between times T1 and T5. The field of view illustrated in FIG. 4A includes entities 400, 410, and 420. Monitoring device 130 may identify each entity within the field of view. Specifically, processor 150 may execute an object detection algorithm and a segmentation task, e.g., such as foreground-background segmentation, to generate object classifiers used to identify each entity. Here, monitoring device 130 may identify entity 400 as a backpack, entity 410 as a person, and entity 420 as an additional person based on the object classifiers. Once each entity has been identified, monitoring device 130 may generate a node for each identified entity within the field of view of monitoring device 130.

Figure 4B:
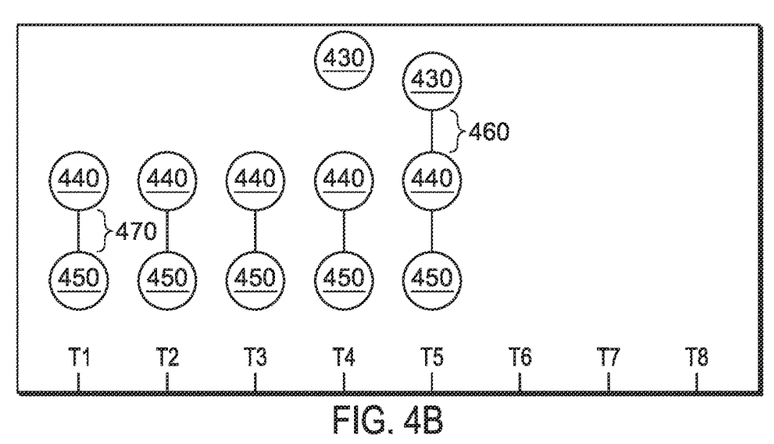

FIG. 4B illustrates a representation of a graph data structure that includes nodes representing entities shown in FIG. 4A. Specifically, FIG. 4B illustrates nodes 440, 450, and 430 representing entities 400, 410, and 420 shown in FIG. 4A, respectively. Processor 150 of monitoring device 130 may generate trajectory data for each node representing an entity and identify trajectory relationships among the nodes. In the example shown in FIG. 4B, nodes 440 and 450 exhibit similar trajectories from times T1 through T5. Therefore, processor 150 has generated an edge 470 indicating a positional orientation of node 440 in relation to node 450. That is, edge 470 may represent the observed positional orientation of entity 400 (backpack) in relation to entity 410 (person). In addition, nodes 440 and 430 exhibit similar trajectories shorty after entity 420 enters the field of view of monitoring device 130 at time T4 (as shown in FIG. 4A). In response, processor 150 has generated an edge 460 between nodes 440 and 430 indicating a positional orientation of node 440 in relation to node 430. That is, edge 460 may represent the observed positional orientation of entity 400 (backpack) in relation to entity 420 (person).

Figure 4C:
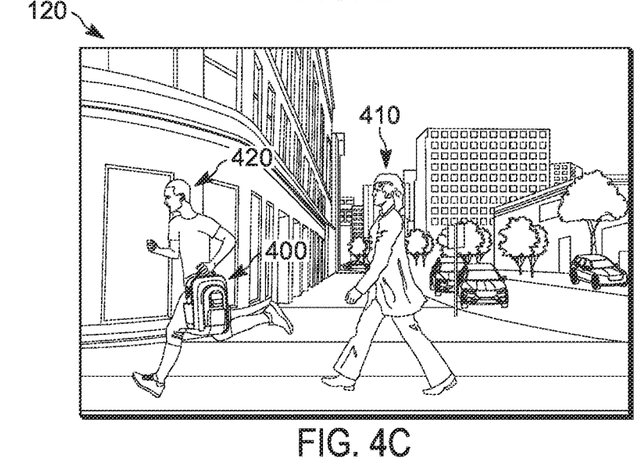

FIG. 4C illustrates the field of view captured by monitoring device 130 in geographic area 120 between times T6 through T8. As shown in FIG. 4C, the field of view captured by monitoring device 130 still includes entities 400, 410, and 420 detected in the field of view shown in FIG. 4A from times T1 through T5. No additional entities have entered the field of view of monitoring device 130 and none of the entities 400, 410, or 420 have exited the field of view. However, entities 400 and 420 have advanced from the previous location shown in FIG. 4A from the right side of the field of view to the left side of the field of view. Conversely, entity 410 has remained in the previous location shown in FIG. 3A and entity 410 has become spatially separated from entities 400 and 420. Specifically, entity 420 has taken entity 400 from entity 410 and is currently running away from entity 410 while holding entity 400.

Figure 4D:
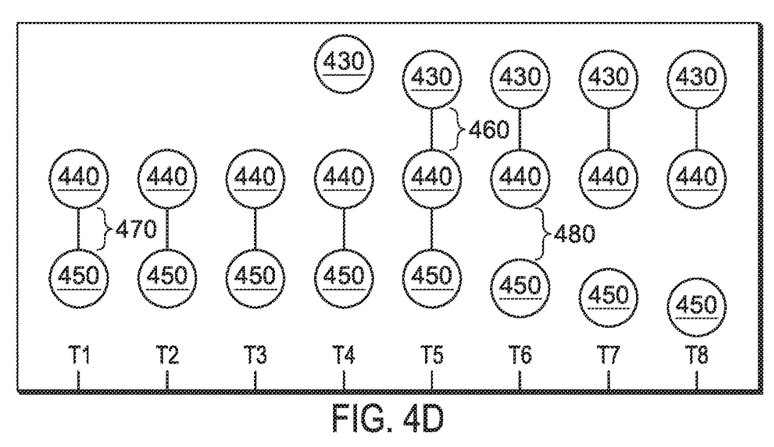

FIG. 4D illustrates nodes representing entities between times T1 and T8. As shown in FIG. 4D, the trajectory data and trajectory relationship between nodes 440 and 450 have changed throughout the observation period. That is, nodes 440 and 450 have started to diverge at time T6 such that edge 470 is no longer connecting the two nodes. Rather, a gap 480 has replaced edge 470 indicating that nodes 440 and 450 no longer exhibit similar trajectories and that the trajectory relationship between nodes 440 and 450 has ended as the entities grow further apart as time advances. Additionally, the trajectory data and trajectory relationship between nodes 440 and 430 have changed throughout the observation period. Nodes 440 and 430 have started to converge in proximity at time T4 such that processor 150 generates edge 460 at time T5 and maintains edge 460 as time advances. Here, monitoring device 130 may detect an anomaly in the observed relationship data between entities 400, 410, and 420 at time T6. Specifically, processor 150 of monitoring device 130 may access the expected relationship data stored in relationship database 140 and determine that the expected relationship between a backpack node (node 440), a person node (node 450), and an additional person node (node 430) typically maintains an edge between a person node and a backpack node rather than generating a new edge between an additional person node and the backpack node. Because nodes 440 and 450 no longer include edge 470 at time T6, and nodes 440 and 430 include edge 460 at time T6, processor 150 may provide electronic notification to safety officer 170 indicating that the observed relationships between entities 400, 410, and 420 are likely to represent at least one anomaly. In the example use case illustrated in FIGS. 4A-4D, safety officer 170 may provide confirmation data indicating that the observed relationships between entities 400, 410, and 420 represent at least one anomaly. Detecting at least one anomaly in the observed relationships between entities 400, 410, and 420 and receiving confirmation data may serve as a deterrent for potential criminal activities in geographic area 120. For example, entity 420 may represent a thief that has stolen a backpack from its owner and has started to run away with the backpack. Upon providing confirmation data, safety officer 170, or safety officers, may be deployed to geographic area 120 to apprehend the thief and return the stolen backpack to its owner.

Figure 5A:
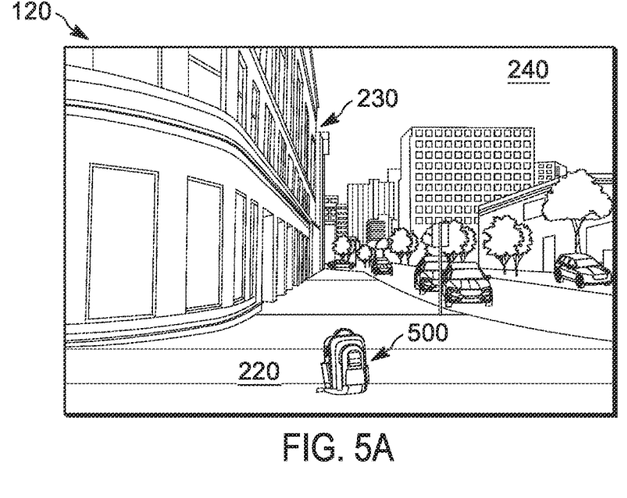
Figure 5B:
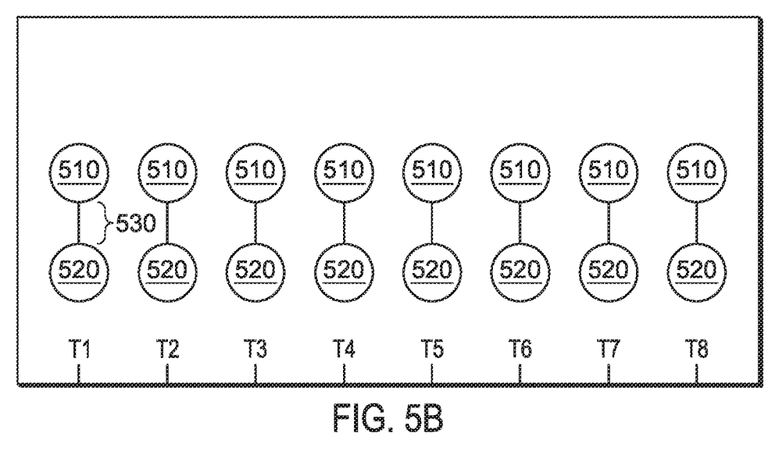

FIGS. 5A and 5B illustrate an example use case of detecting anomalies in a geographic area, in accordance with some embodiments. In the example illustrated in FIGS. 5A and 5B, monitoring device 130 may detect anomalies in geographic area 120 based on expected relationship data received from electronic computing device 110. In the embodiment illustrated in FIGS. 5A and 5B, the number of entities has been limited to four entities, i.e., entities 500, 220, 230, and 240, for illustrative purposes. In other embodiments, a field of view of monitoring device 130 may capture any number of entities located within a geographic area 120. In the embodiment illustrated in FIGS. 5A and 5B, an eight-second portion of an observation period is illustrated, i.e., times T1 through T8, for illustrative purposes. In other embodiments, observation periods may include any length of time suitable for detecting anomalies in a geographic area 120.

FIG. 5A illustrates a field of view captured by monitoring device 130 in geographic area 120 between times T1 and T8. The field of view illustrated in FIG. 5A includes entities 500, 220, 230, and 240. Monitoring device 130 may identify each entity within the field of view. For example, processor 150 may execute an object detection algorithm and a segmentation task, e.g., such as foreground-background segmentation, to generate object classifiers used to identify each entity. Here, monitoring device 130 may identify entity 500 as a backpack, entity 220 as a sidewalk, entity 230 as a building, and entity 240 as the sky based on the object classifiers. Once each entity has been identified, monitoring device 130 may generate a node for each identified entity within the field of view of monitoring device 130. However, only two nodes are shown in FIG. 5B for illustrative purposes.

FIG. 5B illustrates a representation of a graph data structure that includes nodes representing entities shown in FIG. 5A. Specifically, FIG. 5B illustrates nodes 510 and 520 representing entities 500 and 220 shown in FIG. 5A, respectively. Processor 150 of monitoring device 130 may generate trajectory data for each node representing an entity and identify trajectory relationships among the nodes. In the example shown in FIG. 5B, nodes 510 and 520 consistently exhibit similar trajectories between times T1 and T8. Therefore, processor 150 has generated an edge 530 indicating a temporal orientation of node 510 in relation to node 520. That is, edge 530 may represent the observed temporal orientation of entity 500 (backpack) in relation to entity 220 (sidewalk) over time. Here, monitoring device 130 may detect an anomaly in the observed relationship data between entities 500 and 220 at any time greater than T5. Specifically, processor 150 of monitoring device 130 may access the expected relationship data stored in relationship database 140 and determine that the expected temporal orientation indicates that a node representing a backpack (node 510) and a node representing a sidewalk (node 520) typically do not include an edge for time periods exceeding five seconds during a training period, e.g., indicating that the backpack has not been lost or abandoned. Given that nodes 510 and 520 include edge 530 for a time period greater than five seconds, processor 150 may provide an electronic notification to safety officer 170 indicating that the observed relationship between entities 500 and 220 is likely to represent an anomaly. In the example use case illustrated in FIGS. 5A and 5B, safety officer 170 may provide confirmation data indicating that the observed relationship between entities 500 and 220 represents the anomaly. By detecting the anomaly in the observed relationship between entities 500 and 220 and receiving confirmation data from safety officer 170, anomaly detection system 100 may serve as a deterrent for potential criminal activities in geographic area 120. For example, entity 500 may represent an enclosure for an explosive device maliciously positioned on the sidewalk adjacent to a busy intersection. Upon providing confirmation data, safety officer 170, or safety officers, may be deployed to geographic area 120 to retrieve the backpack from geographic area 120.

Figure 6:
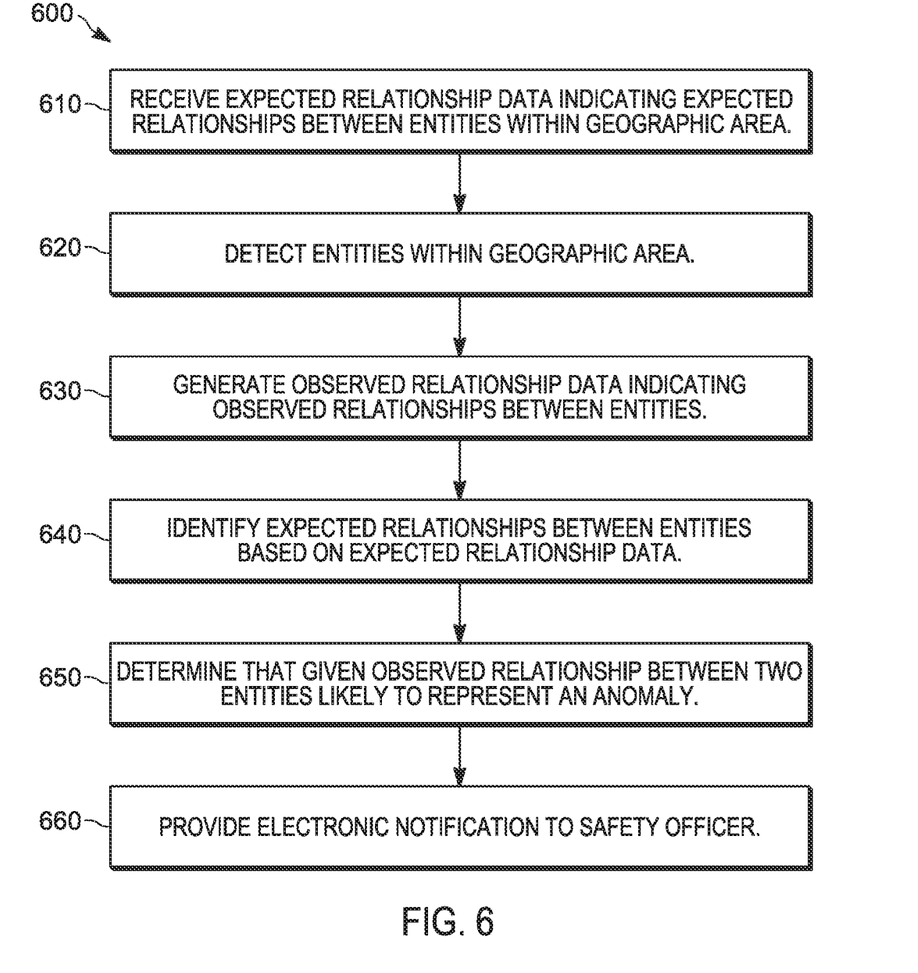
FIG. 6 is a flowchart illustrating selected elements of an example process for detecting anomalies in a geographic area, in accordance with some embodiments.

FIG. 6 is a flowchart illustrating selected elements of an example process for detecting anomalies in a geographic area, in accordance with some embodiments. In at least some embodiments, some or all of the operations shown in FIG. 6 may be performed by an anomaly detection system, such as anomaly detection system 100 illustrated in FIG. 1. In at least some embodiments, the anomaly detection system may include a processor and a memory storing instructions that when executed by the processor cause the processor to perform one or more of the operations illustrated in FIG. 6. In other embodiments, anomaly detection system 100 may include a hardware state machine or other electronic circuitry configured to perform one or more of the operations illustrated in FIG. 6. While a particular order of operations is indicated in FIG. 6 for illustrative purposes, the timing and ordering of such operations may vary where appropriate without negating the purpose and advantages of the examples set forth in detail throughout the remainder of this disclosure.

In this example embodiment, process 600 begins at block 610 with receiving expected relationship data indicating expected relationships between entities within geographic area 120. Expected relationship data may indicate typical, or statistically normal, relationships amongst entities as observed during a training period. That is, expected relationship data may indicate relationships between entities within respective geographic areas 120 during a training period and may be used to determine which of those identified relationships are, statistically, most likely to occur within the geographic area 120. In one embodiment, electronic computing device 110 may provide trajectory data indicating respective trajectories of nodes representing the entities and the trajectory relationships between the nodes to a machine-learned model as training data. The machine-learned model may identify patterns that most frequently occur within the training data for a geographic area 120 during the training period. In one embodiment, electronic computing device 110 may use these identified patterns to generate expected relationship data for each geographic area 120. In another embodiment, the machine-learned model may generate the expected relationship data for each geographic area 120. In another embodiment, expected relationship data may be generated by processor 150 of monitoring device 130. Each geographic area 120 may yield its own expected relationship data based on the types of entities typically located within the geographic area 120.

At block 620, the process 600 includes detecting entities within geographic area 120. In particular, monitoring device 130 may detect entities within the geographic area 120 in which the monitoring device 130 is deployed. In one embodiment, monitoring device 130 may be or include an image sensor, e.g., such as an RGB camera, having a field of view spanning a portion, or entirety, of geographic area 120. Monitoring device 130 may detect entities within the geographic area 120 as the entities enter the field of view of monitoring device 130. In another embodiment, monitoring device 130 may be or include a proximity sensor, e.g., such as a light detection and ranging (LiDAR) sensor, that emits pulses of laser light beams throughout a geographic area 120. Monitoring device 130 may detect entities within the geographic area 120 as the entities reflect the laser light beams while entering geographic area 120. In another embodiment, monitoring device 130 may be or include an audio sensor, e.g., such as an ultrasonic sensor, that emits sound waves throughout geographic area 120. Monitoring device 130 may detect entities within the geographic area 120 as the entities reflect the sound waves while entering geographic area 120. In other embodiments, entities may be detected using any combination of monitoring devices 130 described above.

At block 630, the process 600 includes generating observed relationship data indicating observed relationships between the entities. For example, processor 150 may generate a node for each detected entity in a video stream and classify each node using an object classifier. In one embodiment, each node may be represented as an entry within a graph data structure representing a geographic area 120. Processor 150 may generate trajectory data for each node representing an entity within a geographic area 120 and identify trajectory relationships between nodes. Based on the trajectory data for each node representing an entity and the identified trajectory relationships, processor 150 may generate edges to represent relationships between entities. In one embodiment, processor 150 may generate an edge between two nodes that indicates an observed positional orientation of one node in relation to the other node. In another embodiment, processor 150 may generate an edge between two nodes that indicates an observed temporal orientation of one node in relation to the other node.

At block 640, the process 600 includes identifying the expected relationships between the entities based on the expected relationship data. Specifically, processor 150 may access expected relationship data indicating expected relationships between entities within a geographic area 120 to compare the expected relationship data with observed relationship data generated by monitoring device 130. Here, processor 150 may determine, for each pair of nodes within a graph data structure representing the geographic area 120, which pairs of nodes of the observed relationship data match with, or otherwise resemble, pairs of nodes of the expected relationship data.

At block 650, the process 600 includes determining that a given observed relationship between two entities is likely to represent an anomaly based on the expected relationship data. In particular, processor 150 may determine that a pair of nodes for a given observed relationship includes an edge where the pair of nodes does not include the edge based on expected relationship data. Similarly, processor 150 may determine that a pair of nodes for a given observed relationship does not include an edge where the pair of nodes does include the edge based on expected relationship data. Here, processor 150 may determine that the given observed relationship between two entities represented by the pair of nodes likely represents an anomaly.

At block 660, the process 600 includes providing an electronic notification to a safety officer. Specifically, upon determining that the given observed relationship likely represents an anomaly, processor 150 may provide an electronic notification to a safety officer 170 indicating that the given observed relationship is likely to represent an anomaly. For example, processor 150 may transmit a signal to electronic communication device 180 indicating that the given observed relationship likely represents the anomaly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system or method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. An anomaly detection system, comprising:
an electronic computing device; and
a monitoring device located in a geographic area, the monitoring device configured to:
receive expected relationship data from the electronic computing device, the expected relationship data indicating expected relationships between a plurality of entities within the geographic area, the expected relationship data based on a data stream including object classifiers describing the plurality of entities within the geographic area;

detect the plurality of entities within the geographic area;

generate observed relationship data indicating observed relationships between the plurality of entities;

identify the expected relationships between the plurality of entities based on the expected relationship data;

determine that a given observed relationship between two entities of the plurality of entities is likely to represent an anomaly based on the expected relationship data; and provide an electronic notification to a safety officer, the electronic notification indicating that the given observed relationship is likely to represent the anomaly.

2. The anomaly detection system of claim 1, wherein the electronic computing device is configured to:

receive the data stream from the monitoring device;

generate trajectory data for the plurality of entities based on the data stream, the trajectory data indicating a respective trajectory for each of the plurality of entities;

identify trajectory relationships between the plurality of entities based on the object classifiers and the trajectory data;

provide the trajectory data and the trajectory relationships to a machine-learned model as training data;

generate the expected relationship data based on the machine-learned model; and transmit the expected relationship data to the monitoring device.

3. The anomaly detection system of claim 1, wherein to generate the observed relationship data indicating the observed relationships between the plurality of entities, the monitoring device is further configured to:

generate a plurality of nodes representing the plurality of entities within the geographic area, each of the plurality of nodes representing an entity of the plurality of entities; and generate a plurality of edges, each of the plurality of edges representing a relationship between two nodes of the plurality of nodes.

4. The anomaly detection system of claim 3, wherein to determine that the given observed relationship between the two entities is likely to represent the anomaly, the monitoring device is further configured to, for a pair of nodes of the plurality of nodes:

determine that the pair of nodes includes an edge of the plurality of edges based on the observed relationship data, wherein the pair of nodes does not include the edge based on the expected relationship data; or determine that the pair of nodes does not include the edge based on the observed relationship data, wherein the pair of nodes includes the edge based on the expected relationship data.

5. The anomaly detection system of claim 1, wherein the observed relationships between the plurality of entities comprise at least one of:

an observed positional orientation of each of the plurality of entities in relation to one another, the observed positional orientation indicated by the observed relationship data; and an observed temporal orientation of each of the plurality of entities in relation to one another, the observed temporal orientation indicated by the observed relationship data.

6. The anomaly detection system of claim 1, wherein the expected relationships between the plurality of entities within the geographic area comprise at least one of:

an expected positional orientation of each of the plurality of entities in relation to one another, the expected positional orientation indicated by the expected relationship data; and an expected temporal orientation of each of the plurality of entities in relation to one another, the expected temporal orientation indicated by the expected relationship data.

7. The anomaly detection system of claim 1, wherein the monitoring device is further configured to:

receive, from an electronic communication device of the safety officer, confirmation data indicating that the given observed relationship represents the anomaly.

8. The anomaly detection system of claim 1, wherein the monitoring device is further configured to:

receive, from an electronic communication device of the safety officer, rejection data indicating that the given observed relationship does not represent the anomaly; and modify the expected relationship data to indicate that the given observed relationship does not represent the anomaly.

9. A method for detecting anomalies in a geographic area, the method comprising:

receiving, from an electronic computing device, expected relationship data indicating expected relationships between a plurality of entities within the geographic area, the expected relationship data based on a data stream including object classifiers describing the plurality of entities within the geographic area;

detecting the plurality of entities within the geographic area;

generating observed relationship data indicating observed relationships between the plurality of entities;

identifying the expected relationships between the plurality of entities based on the expected relationship data;

determining that a given observed relationship between two entities of the plurality of entities is likely to represent an anomaly based on the expected relationship data; and providing an electronic notification to a safety officer, the electronic notification indicating that the given observed relationship is likely to represent the anomaly.

10. The method of claim 9, wherein generating the observed relationship data indicating the observed relationships between the plurality of entities comprises:

generating a plurality of nodes representing the plurality of entities within the geographic area, each of the plurality of nodes representing an entity of the plurality of entities; and generating a plurality of edges, each of the plurality of edges representing a relationship between two nodes of the plurality of nodes.

11. The method of claim 10, wherein determining that the given observed relationship between the two entities of the plurality of entities is likely to represent the anomaly comprises, for a pair of nodes of the plurality of nodes:

determining that the pair of nodes includes an edge of the plurality of edges based on the observed relationship data, wherein the pair of nodes does not include the edge based on the expected relationship data; or determining that the pair of nodes does not include the edge based on the observed relationship data, wherein the pair of nodes includes the edge based on the expected relationship data.

12. The method of claim 9, wherein the observed relationships between the plurality of entities comprise at least one of:
  an observed positional orientation of each of the plurality of entities in relation to one another, the observed positional orientation indicated by the observed relationship data; and
  an observed temporal orientation of each of the plurality of entities in relation to one another, the observed temporal orientation indicated by the observed relationship data.

13. The method of claim 9, wherein the expected relationships between the plurality of entities within the geographic area comprise at least one of:
  an expected positional orientation of each of the plurality of entities in relation to one another, the expected positional orientation indicated by the expected relationship data; and
  an expected temporal orientation of each of the plurality of entities in relation to one another, the expected temporal orientation indicated by the expected relationship data.

14. The method of claim 9, further comprising:
  receiving, from an electronic communication device of the safety officer, confirmation data indicating that the given observed relationship represents the anomaly.

15. The method of claim 9, further comprising:
  receiving, from an electronic communication device of the safety officer, rejection data indicating that the given observed relationship does not represent the anomaly; and
  modifying the expected relationship data to indicate that the given observed relationship does not represent the anomaly.

16. A non-transitory computer readable medium storing program instructions executable by a processor for performing:
  receiving, from an electronic computing device, expected relationship data indicating expected relationships between a plurality of entities within a geographic area, the expected relationship data based on a data stream including object classifiers describing the plurality of entities within the geographic area;
  detecting the plurality of entities within the geographic area;
  generating observed relationship data indicating observed relationships between the plurality of entities;
  identifying the expected relationships between the plurality of entities based on the expected relationship data;
  determining that a given observed relationship between two entities of the plurality of entities is likely to represent an anomaly based on the expected relationship data; and
  providing an electronic notification to a safety officer, the electronic notification indicating that the given observed relationship is likely to represent the anomaly.

17. The non-transitory computer readable medium of claim 16, wherein generating the observed relationship data indicating the observed relationships between the plurality of entities comprises:
  generating a plurality of nodes representing the plurality of entities within the geographic area, each of the plurality of nodes representing an entity of the plurality of entities; and
  generating a plurality of edges, each of the plurality of edges representing a relationship between two nodes of the plurality of nodes.

18. The non-transitory computer readable medium of claim 17, wherein determining that the given observed relationship between the two entities of the plurality of entities is likely to represent the anomaly comprises, for a pair of nodes of the plurality of nodes:
  determining that the pair of nodes includes an edge of the plurality of edges based on the observed relationship data, wherein the pair of nodes does not include the edge based on the expected relationship data; or
  determining that the pair of nodes does not include the edge based on the observed relationship data, wherein the pair of nodes includes the edge based on the expected relationship data.

19. The non-transitory computer readable medium of claim 16, wherein the observed relationships between the plurality of entities comprise at least one of:
  an observed positional orientation of each of the plurality of entities in relation to one another, the observed positional orientation indicated by the observed relationship data; and
  an observed temporal orientation of each of the plurality of entities in relation to one another, the observed temporal orientation indicated by the observed relationship data.

20. The non-transitory computer readable medium of claim 16, wherein the expected relationships between the plurality of entities within the geographic area comprise at least one of:
  an expected positional orientation of each of the plurality of entities in relation to one another, the expected positional orientation indicated by the expected relationship data; and
  an expected temporal orientation of each of the plurality of entities in relation to one another, the expected temporal orientation indicated by the expected relationship data.

* * * * *